(12) United States Patent
Rogers

(10) Patent No.: US 12,072,056 B2
(45) Date of Patent: Aug. 27, 2024

(54) WEAR INSERTS FOR WELL SERVICE REACTIVE DAMPENERS

(71) Applicant: Performance Pulsation Control, Inc., Richardson, TX (US)

(72) Inventor: John Thomas Rogers, Garland, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 224 days.

(21) Appl. No.: 17/453,146

(22) Filed: Nov. 1, 2021

(65) Prior Publication Data
US 2022/0136639 A1 May 5, 2022

Related U.S. Application Data

(60) Provisional application No. 63/107,936, filed on Oct. 30, 2020.

(51) Int. Cl.
| | |
|---|---|
| *F16L 57/06* | (2006.01) |
| *F04B 11/00* | (2006.01) |
| *F16L 55/05* | (2006.01) |
| *E21B 43/26* | (2006.01) |

(52) U.S. Cl.
CPC .......... *F16L 57/06* (2013.01); *F04B 11/0091* (2013.01); *F16L 55/05* (2013.01); *E21B 43/2607* (2020.05)

(58) Field of Classification Search
CPC ....... F16L 55/05; F16L 57/06; E21B 43/2607; F04B 11/0091

USPC .......................................................... 138/26
See application file for complete search history.

(56) References Cited

U.S. PATENT DOCUMENTS

| | | | |
|---|---|---|---|
| 4,177,016 A | 12/1979 | Aude | |
| 4,186,776 A | 2/1980 | Burton | |
| 5,064,360 A | * 11/1991 | Blum | .................. F04B 11/0016 137/565.34 |

(Continued)

FOREIGN PATENT DOCUMENTS

| | | |
|---|---|---|
| WO | 9809108 A1 | 3/1998 |
| WO | 2012100192 A1 | 7/2012 |

OTHER PUBLICATIONS

International Search Report and Written Opinion of the International Searching Authority dated Jan. 27, 2022, in connection with International Application No. PCT/US2021/057607, 14 pages.

(Continued)

*Primary Examiner* — David R Deal

(57) ABSTRACT

Replaceable wear inserts of a material resisting abrasive wear due to particulates within pumped fluid are used for the inlet and/or outlet of a pulsation dampener coupled to the outlet of a land-base or mobile-mounted pump. The wear inserts may be integrated with pressure orifice devices contributing to pressure pulsation dampening. The wear inserts may have internal passages or be mounted to create turbulent flow through the pulsation dampener to mitigate the risk of dead spots accumulating particulates. The wear inserts may be sized for either "loose" or "tight" fit within the inlet and outlet to facilitate removability despite the potential for particulates embedding within the gap. Grooves may be provided with O rings to seal against pressure leaks.

18 Claims, 17 Drawing Sheets

(56) References Cited

U.S. PATENT DOCUMENTS

| | | | |
|---|---|---|---|
| 6,305,421 | B1 | 10/2001 | Ahrweiler |
| 7,861,743 | B1 | 1/2011 | Wren |
| 9,249,915 | B2 * | 2/2016 | Rogers ................ F04B 11/0091 |
| 10,408,235 | B2 * | 9/2019 | Suhara ...................... F15B 1/22 |
| 2005/0173852 | A1 | 8/2005 | Zimpfer et al. |
| 2012/0189477 | A1 | 7/2012 | Rogers |
| 2012/0255734 | A1 | 10/2012 | Coli et al. |
| 2013/0075079 | A1 * | 3/2013 | Artherholt .......... E21B 43/2607 |
| | | | 166/177.5 |
| 2014/0332105 | A1 * | 11/2014 | Dunn ..................... F16L 57/06 |
| | | | 138/26 |
| 2017/0184246 | A1 * | 6/2017 | Espinasse ............... E21C 50/00 |
| 2018/0044999 | A1 * | 2/2018 | Stack ................... E21B 17/003 |
| 2019/0331100 | A1 | 10/2019 | Gable et al. |
| 2020/0032779 | A1 | 1/2020 | Rogers |

OTHER PUBLICATIONS

Supplementary European Search Report dated Jun. 19, 2024, in connection with European Application No. 21887734.8, 9 pages.

* cited by examiner

WEAR INSERTS FOR WELL SERVICE REACTIVE DAMPENERS

CROSS-REFERENCE TO RELATED APPLICATION AND PRIORITY CLAIM

This application claims priority under 35 U.S.C. § 119(e) to U.S. Provisional Patent Application No. 63/107,936 filed on Oct. 30, 2020, which is hereby incorporated by reference in its entirety.

TECHNICAL FIELD

The present application relates generally to pulsation dampeners and, more specifically, to improving wear resistance in such devices.

BACKGROUND

Pulsation control in fluid transfer systems is in constant need of improvement. Among the desirable improvements are reducing wear and failures in harsh environments such as those associated with fracking while also improving or optimizing performance of pulsation dampening.

SUMMARY

A pump system can include a mobile-mounted pump and a pulsation dampener coupled between the mobile-mounted pump and a borehole. The pulsation dampener may be mounted on a trailer, and may be either a flow-through device or an appendage-type device. Replaceable wear inserts of a material resisting abrasive wear due to particulates within pumped fluid are used for the inlet and/or outlet of a pulsation dampener coupled to the outlet of a land-base or mobile-mounted pump. The wear inserts may be integrated with pressure orifice devices contributing to pressure pulsation dampening. The wear inserts may have internal passages or be mounted to create turbulent flow through the pulsation dampener to mitigate the risk of dead spots accumulating particulates. The wear inserts may be sized for either "loose" or "tight" fit within the inlet and outlet to facilitate removability despite the potential for particulates embedding within the gap. Grooves may be provided with O rings to seal against pressure leaks.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged pump discharge piping or system to control or partially control pulsation amplitudes.

Pulsation dampeners, optionally mobile-mounted and optionally with wear inserts as described below, are well suited for use in harsh pumping environments such as those associated with fracking, where the fluid pumped contains a significant amount of sand or other particulates.

Figure 1:
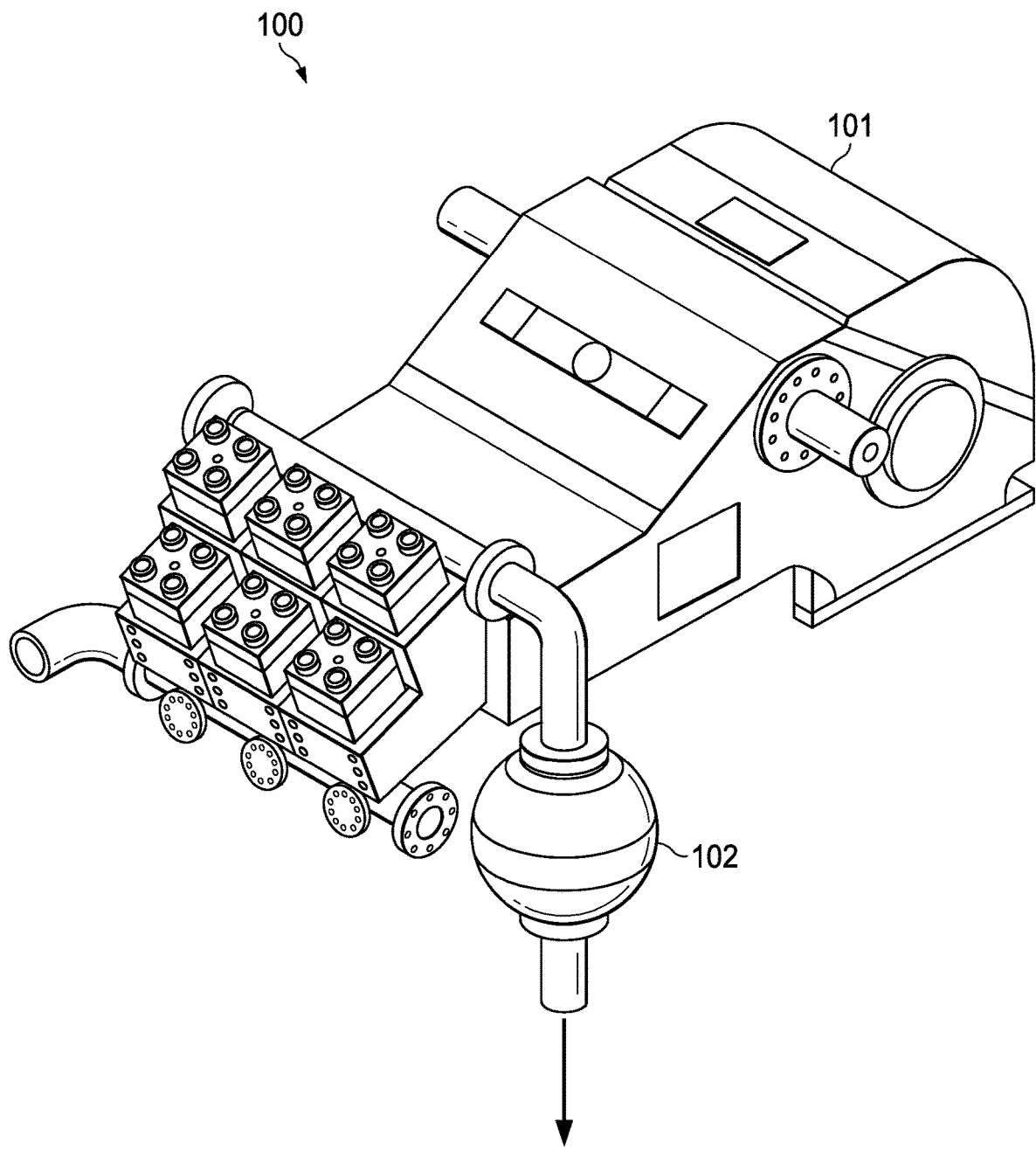
FIG. 1 illustrates installation of a pulsation dampener with wear inserts within a pump system in accordance with embodiments of the present disclosure.

FIG. 1 illustrates installation of a pulsation dampener with wear inserts within a pump system in accordance with embodiments of the present disclosure. In the exemplary pump installation 100 illustrated in FIG. 1, a three-cylinder pump 101 has a pulsation dampener 102 connected at the outlet. While the example of FIG. 1 depicts a flow-through pulsation dampener 102, those skilled in the art will understand that an appendage-type pulsation dampener may alternatively be connected to the pump outlet, connected as known in the art. Rather than having an inlet and a separate outlet as found in the flow-through pulsation dampener 102, an appendage-type dampener will have a single combined inlet and outlet. In the description below, flow-through pulsation dampener designs are discussed in order to describe additional features that are possible for such designs but not necessarily applicable to appendage-type pulsation dampeners. For the most part, however, at least some of the features described below may be suitably implemented in both appendage-type and flow-through pulsation dampeners. In addition, while the pulsation dampener 102 is depicted as proximate to the pump 101 (directly connected to the pump outlet in FIG. 1), the pulsation dampener 102 may be coupled to the pump outlet and positioned at any location suitable for a discharge dampener, such as mounted on the pump skid or platform at a short distance from the pump 101.

Figure 2A:
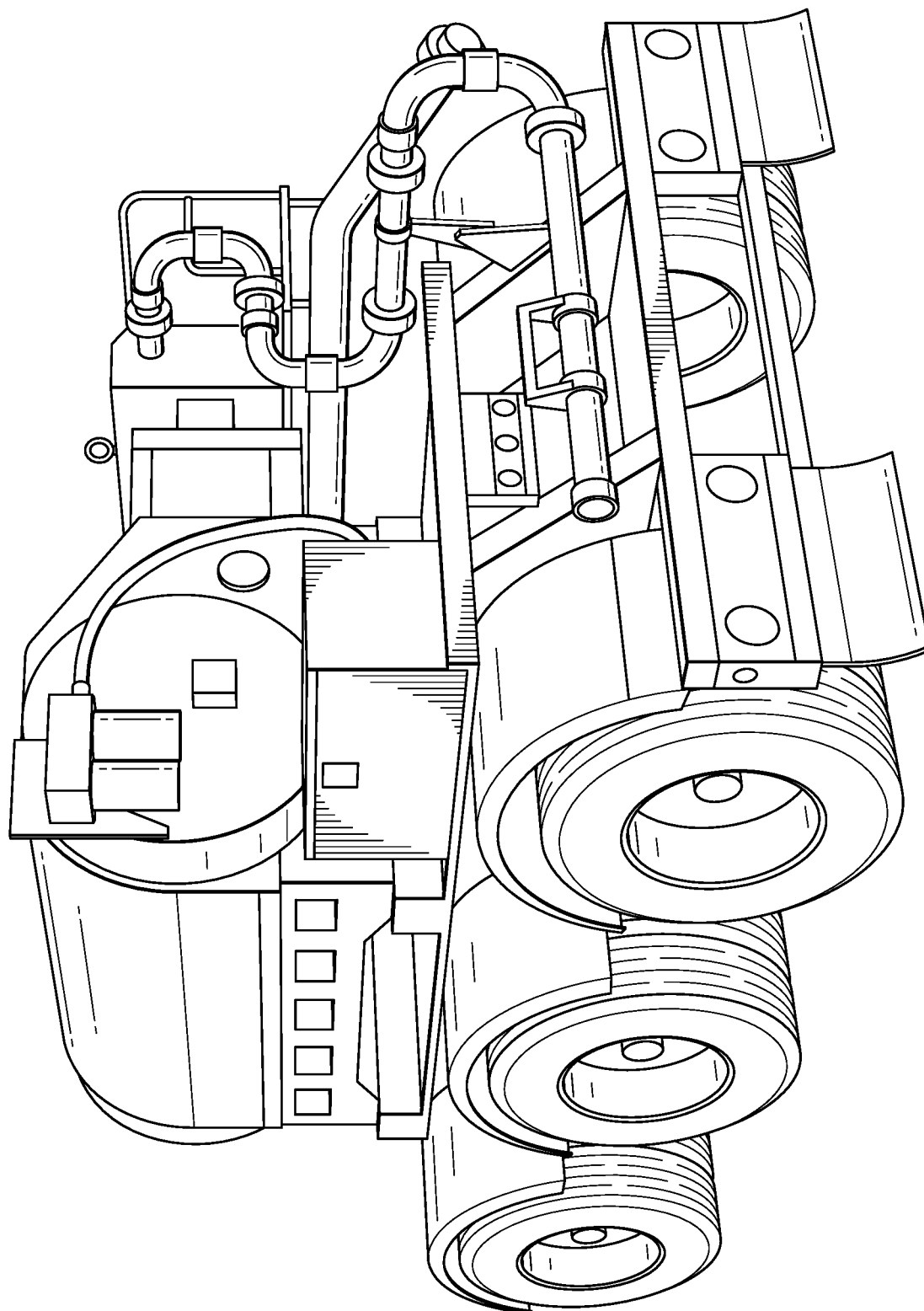
FIGS. 2A, 2B and 2C illustrate a mobile-mounted pump system respectively without and with a pulsation dampener in which wear inserts may be employed in accordance with embodiments of the present disclosure.
Figure 2B:
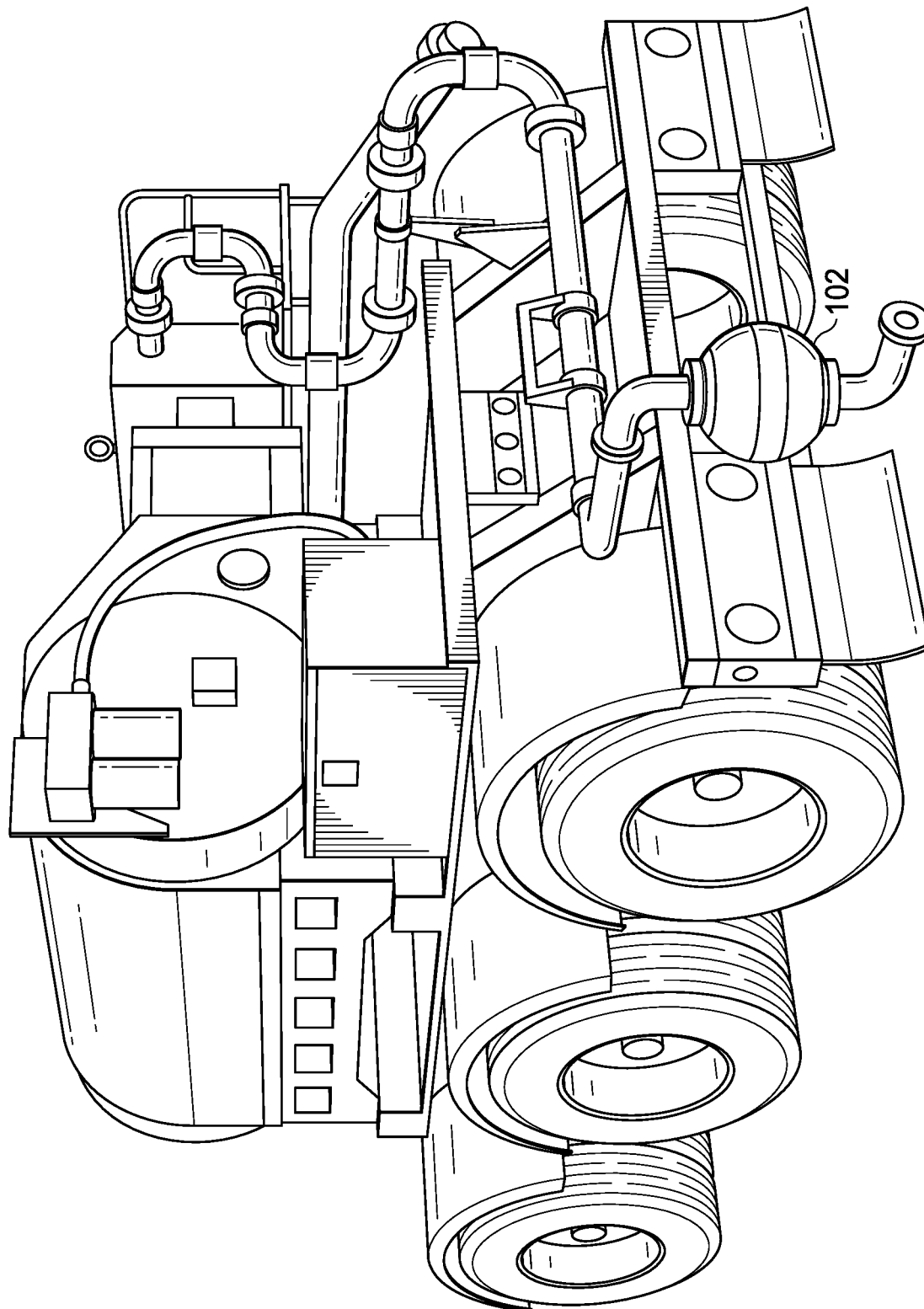
Figure 2C:
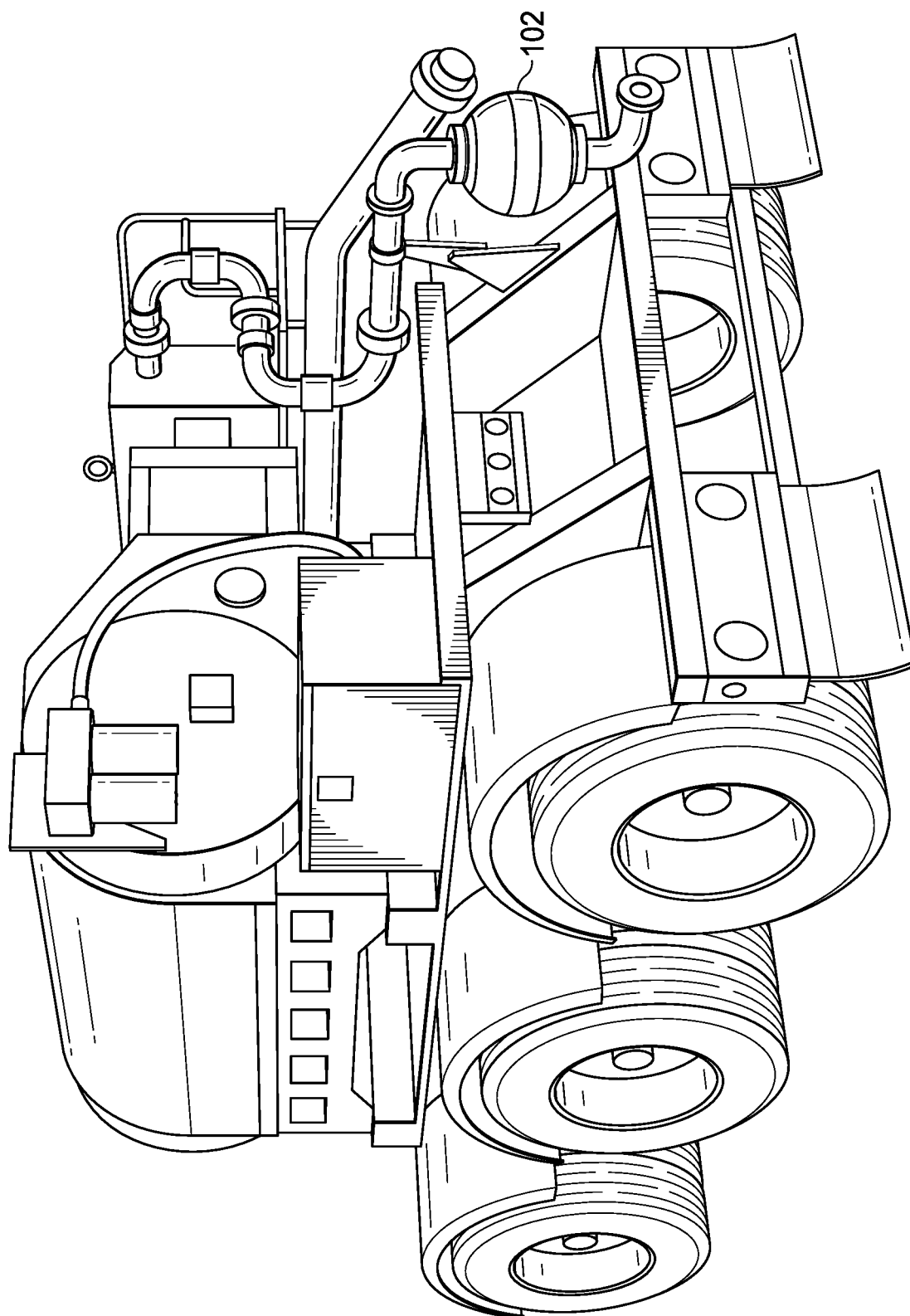

FIGS. 2A, 2B and 2C illustrate a mobile-mounted pump system respectively without and with a pulsation dampener within which wear inserts may be used in accordance with embodiments of the present disclosure. FIG. 2A depicts a service truck (or service trailer) used for well service. As used herein, "well service" refers specifically to temporary pump connection for purposes other than production, and include cementing, pump-down used to locate perforating guns and or other tools, acidizing, fracking and other temporary pumping services. Cementing is necessary after drilling to form a casing keeping the formation from collapsing into the borehole. Perforating involves puncturing the casing to allow fluids to flow into the borehole from the surrounding formation and vice versa, and in directionally-drilled wells requires pump-down of the perforating gun into position. Acidizing involves pumping down acids to leach the formation, making production more effective, while fracking involves pumping down fluids with solids under pressure for the same purpose. Pump-down for perforation and fracking are typically performed alternately, in different zones along a borehole.

The well service truck or trailer of FIG. 2A is often used for cementing, pump-down, acidizing, fracking and related service activities. A pump (depicted in FIG. 2A) on the well service truck or trailer—that is, a "mobile-mounted pump"—is connected to piping on the well service truck or trailer coupled to the pump outlet and providing a point of connection for hoses or piping coupled to a nearby borehole. Normally, the pumping operations performed using a well service truck or trailer are performed without the benefit of a pulsation dampener. As depicted in FIGS. 2B and 2C, the present disclosure contemplates connection of a pulsation dampener 102 between the well service truck or trailer and the borehole, preferably close to the well service truck or trailer. The pulsation dampener 102 may be mounted on the ground (not shown) proximate to the well service truck or trailer as illustrated in FIG. 2B, providing a connection for the piping on the well service truck or trailer. The pulsation dampener 102, if appropriately located, may be left in place when the well service truck or trailer departs, and may be re-used when the well service truck or trailer returns (for example) for another round of pump down, fracking, or for other well service requiring temporary connection to a mobile-mounted pump. The pulsation dampener 102 may be mounted on the well service truck or trailer as illustrated in FIG. 2C, either permanently or semi-permanently, and may travel with the pump. The pulsation dampener 102 may be of the flow-through type as illustrated in FIGS. 2B-2C, or an appendage-type pulsation dampener.

The pulsation dampener 102 in FIGS. 1 and 2B-2C may include wear inserts implemented according to the description below, including any of FIGS. 3A-3E, 4A-4D, 5, 6, 7A-7B, 8A-8C, 9A-9B, 10A-10E, 11 and 11A-11C or permutations thereof.

Figure 3A:
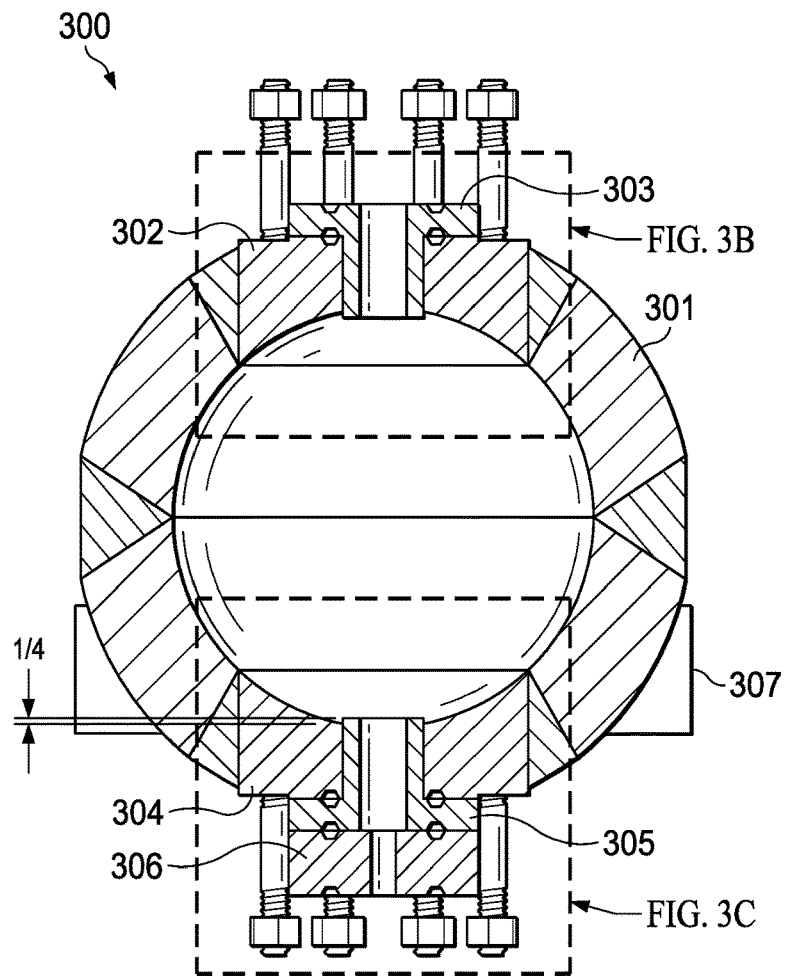
FIGS. 3A through 3E depict a pulsation dampener with wear inserts in accordance with embodiments of the present disclosure.
Figure 3B:
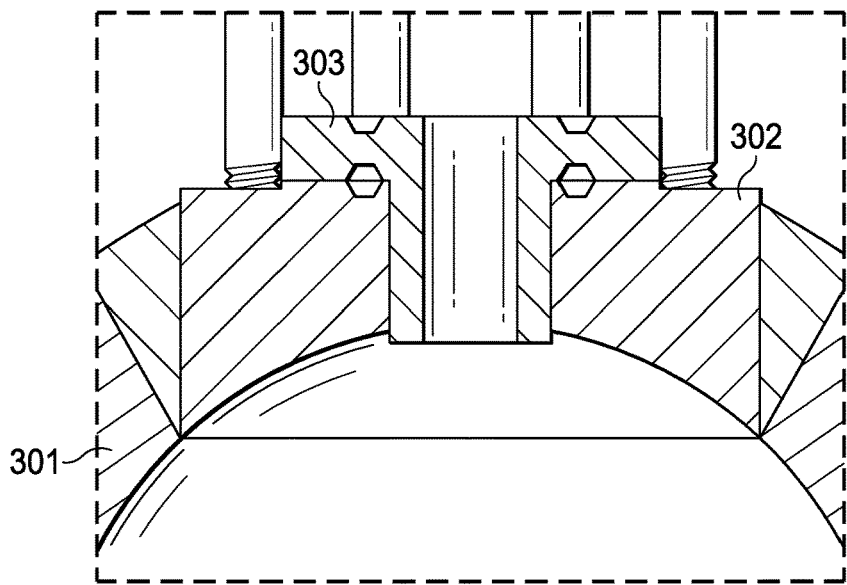
Figure 3C:
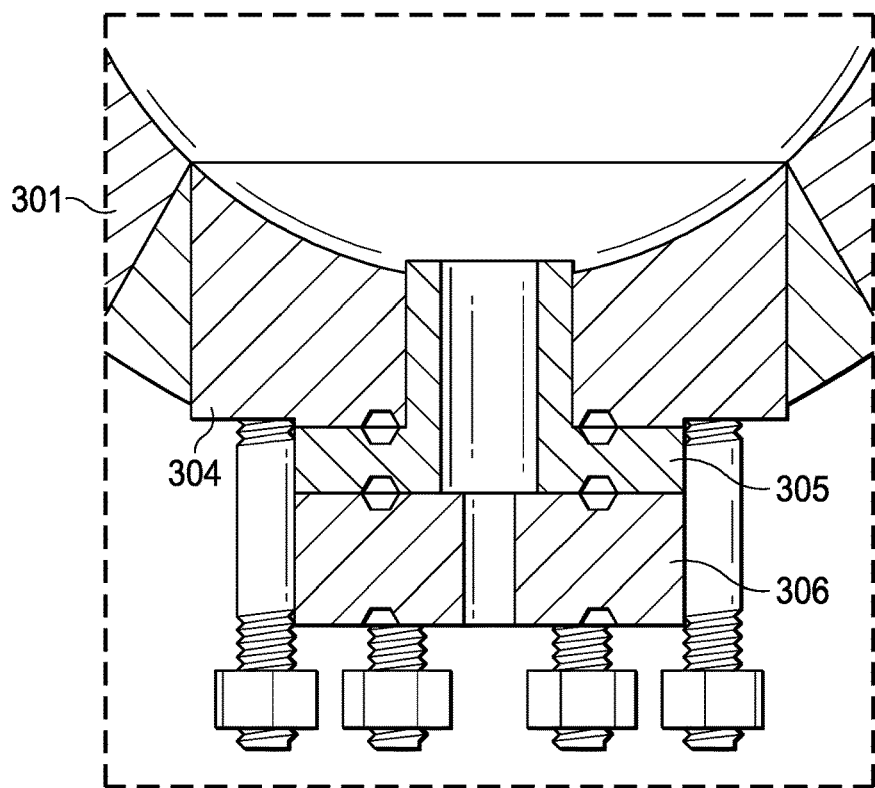
Figure 3D:
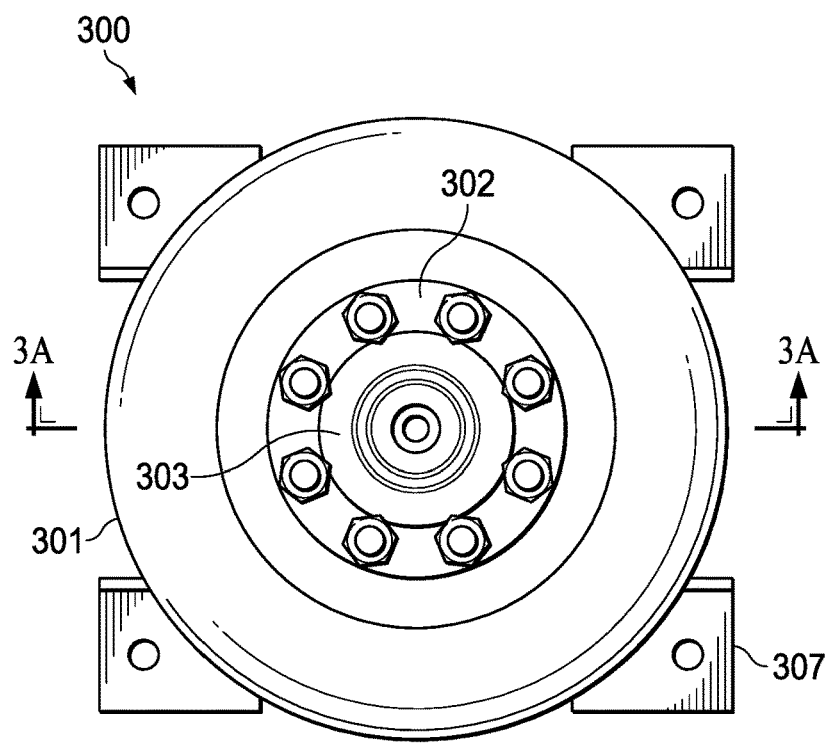
Figure 3E:
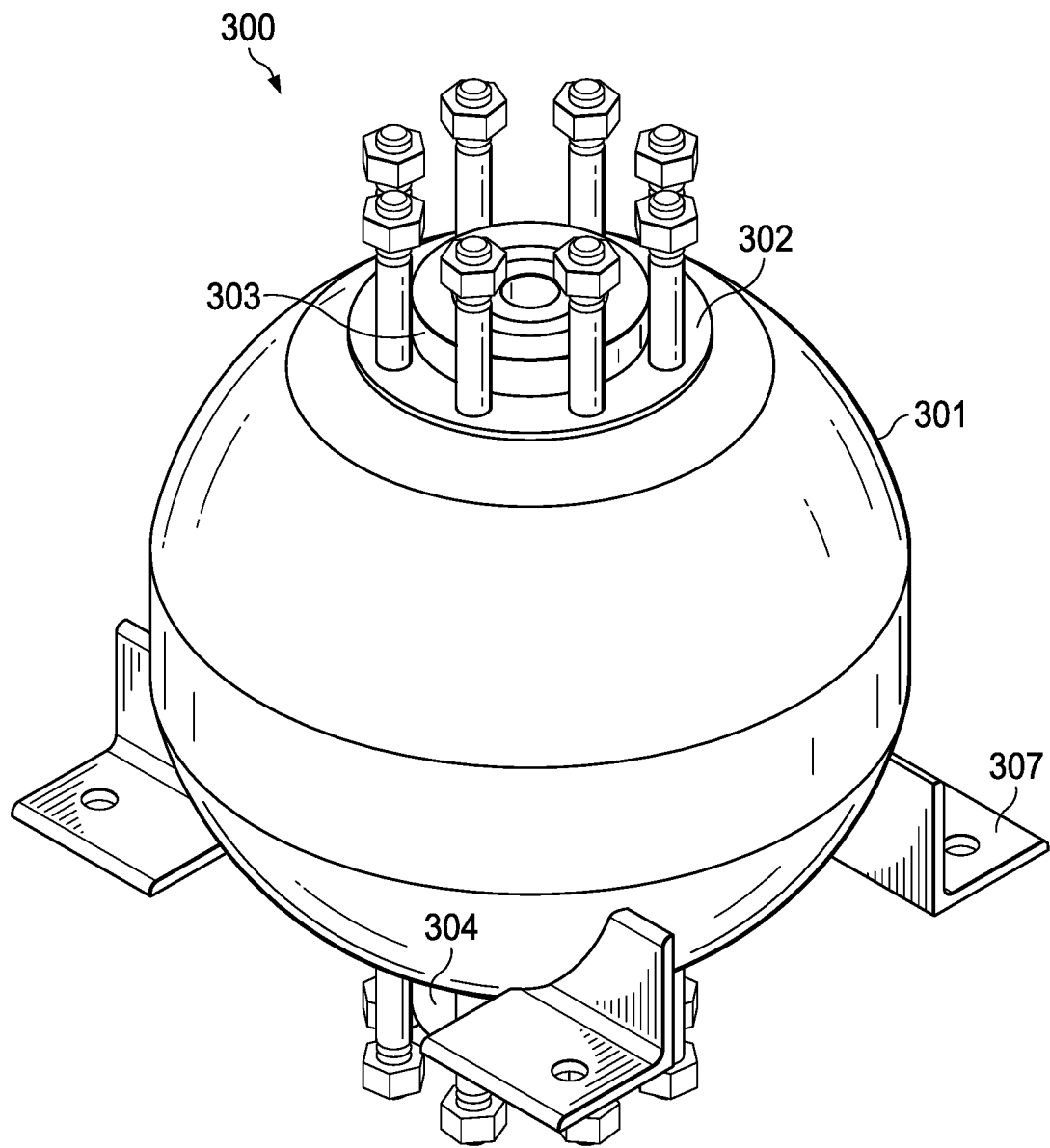

FIGS. 3A through 3E depict a pulsation dampener with wear inserts in accordance with embodiments of the present disclosure. FIG. 3A is a side sectional view taken at section line A-A of the plan view in FIG. 3D, while FIG. 3E is a perspective view. FIG. 3B is a fragmentary detail of FIG. 3A, and FIG. 3C is a fragmentary detail of FIG. 3A. FIGS. 3A through 3E are merely exemplary, for purposes of explaining the principles of the present disclosure, and are not intended to be limiting.

Pulsation dampener 300 has a flow-through design with a generally spherical body 301 having a studded inlet section 302 with a wear insert 303, a studded outlet section 304 with a wear insert 305 and an external pressure orifice device 306, and mounting brackets 307. A flanged connector coupled to the pump outlet (not shown) may be bolted to the studded inlet section 302, and a flanged connector coupled to downstream piping (also not shown) may be bolted to the studded outlet section 304. The mounting brackets 307 may be welded to the body 301 and bolted to a skid or pump platform.

Wear insert 303 and wear insert 305 are replaceable features of a material selected to resist wear by particulates within the fluid being pumped, such as a tungsten carbide alloy. Wear insert 303 and wear insert 305 are each a flanged annulus in the example shown, with the diameter of the flange sufficient to cover the opening of a fluid connector bolted to the respective inlet section 302 or outlet section 304. Pumped fluid within the flanged piping connectors (not shown) respectively secured to the inlet section 302 and the outlet section 304, and the particulates in that pumped fluid, therefore only contacts the wear insert 303 and the wear insert 305, and not outer surfaces of the inlet section 302 and the outlet section 304. The wear insert 303 and the wear insert 305 thus protect the outer surfaces of the inlet section 302 and the outlet section 304 from abrasive wear by particulates in the pumped fluid, which is typically pumped at a significant pressure and flow rate. Since the wear insert 303 and the wear insert 305 are of a material selected to resist or inhibit abrasive wear, the connections to pulsation dampener 300 last longer without loss of the sealing ability of such connections. Meanwhile, the inlet section 302 and the outlet section 304 may be fabricated from a less expensive but still suitable material, consistent with prior pulsation dampener designs.

The annular portions of wear insert 303 and wear insert 305 have a length sufficient to extend through a hole through the respective inlet section 302 or outlet section 304. The inner diameter(s) of the annular portions of wear insert 303 and wear insert 305 are selected according to desired pulsation dampener performance characteristics in accordance with known principles. Fluid pumped into and/or out of the body 301 therefore passes through the annular portions of wear insert 303 and/or wear insert 305 without contacting the material of the respective inlet section 302 or outlet section 304 on the sides of the hole through which the wear inserts extend. Like the flanged portions discussed above, the annular portions of the wear insert 303 and the wear insert 305 thus protect the inlet section 302 and the outlet section 304 from abrasive wear by particulates in the pumped fluid. Particulates within the fluid being pumped therefore cannot widen the holes in the inlet section 302 and the outlet section 304, through which the wear inserts extend, by abrasive wear without first wearing through the annular portion of wear insert 303 or wear insert 305. Since the material of wear insert 303 and wear insert 305 is selected to resist or inhibit such abrasive wear by particulates, pressure leaks due to such wear or degradation of pulsation dampener performance are at least delayed if not completely avoided.

External pressure orifice device 306 may be fabricated from the same material as wear insert 305, or from a different (e.g., less expensive) material. As apparent from FIGS. 3A and 3C, external pressure orifice device 306 has a smaller opening therethrough than the adjacent wear insert 305. External pressure orifice device 306 is therefore a pressure drop feature, providing an exit hole size is smaller than the through-diameter of wear insert 305 (which may be equal to the normal pipe diameter). That difference in opening diameter creates a pressure differential in fluid flow from one side of external pressure orifice device 306 to the other. The pressure differential contributes to the pulsation dampening effect that pulsation dampener provides for the pumped fluid in accordance with known principles. The sizing (diameter) of the opening through external pressure orifice device 306 relative to the size (diameter) of the opening through wear insert 305 is selected based on the volume of pulsation dampener 300, the fluid flow resistance created by the relative size of the opening through the external pressure orifice device 306 relative to the size (diameter) of the opening through wear insert 305, the average and/or peak pumped fluid pressure, the pumped fluid flow rate, the desired maximum peak pressure, and the like in accordance with known principles.

As noted above, wear inserts 303, 305 are designed to be replaceable. External pressure orifice device 306 is optionally also replaceable. Accordingly, during scheduled periodic maintenance of the pulsation dampener 300, after a suitable interval of use, the wear inserts may be replaced with new wear inserts (and, optionally, a new external pressure orifice device), extending the operational life of the pulsation dampener 300.

Figure 4A:
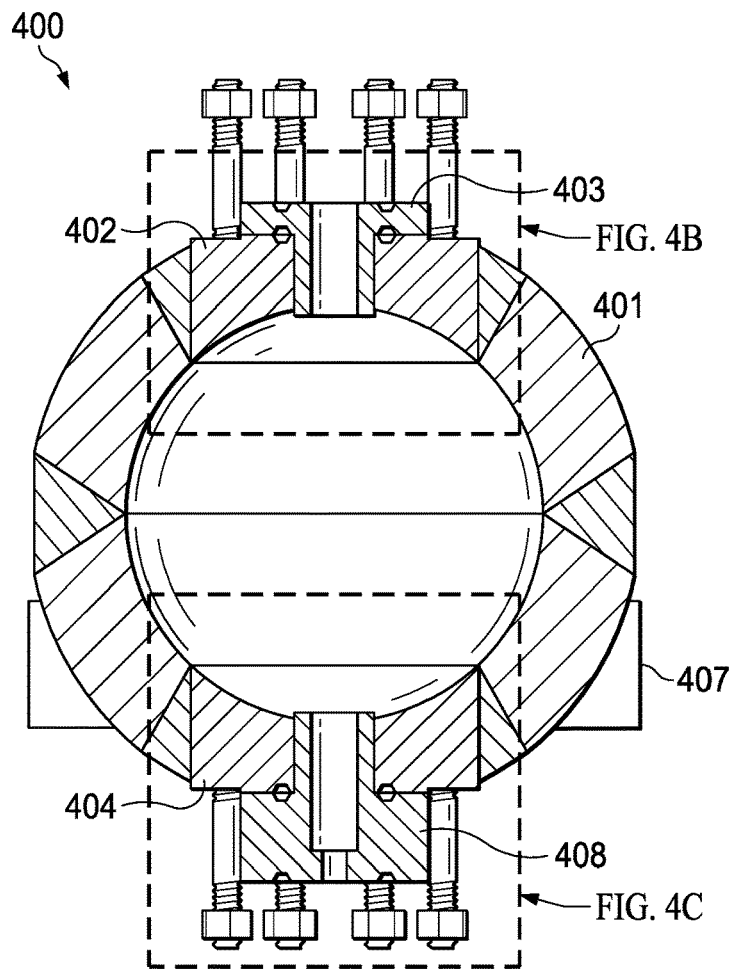
FIGS. 4A through 4D depict a pulsation dampener with wear inserts in accordance with alternative embodiments of the present disclosure.
Figure 4B:
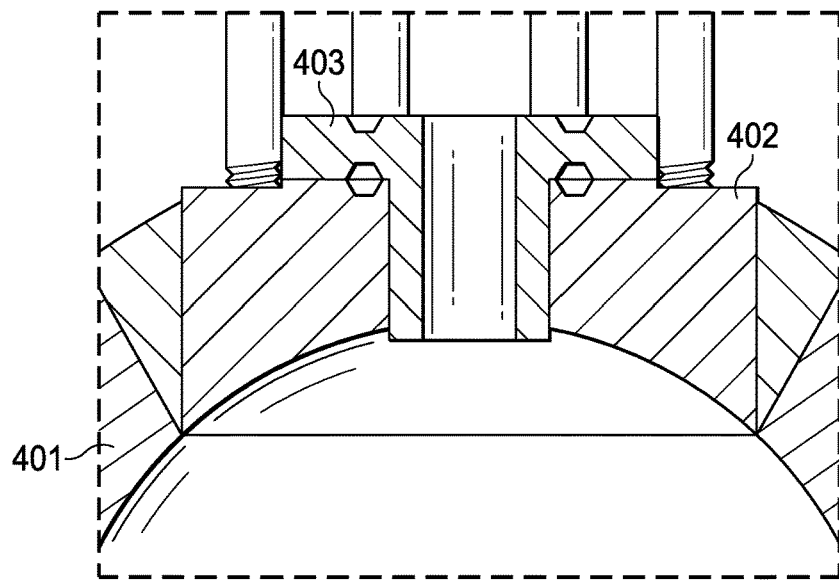
Figure 4C:
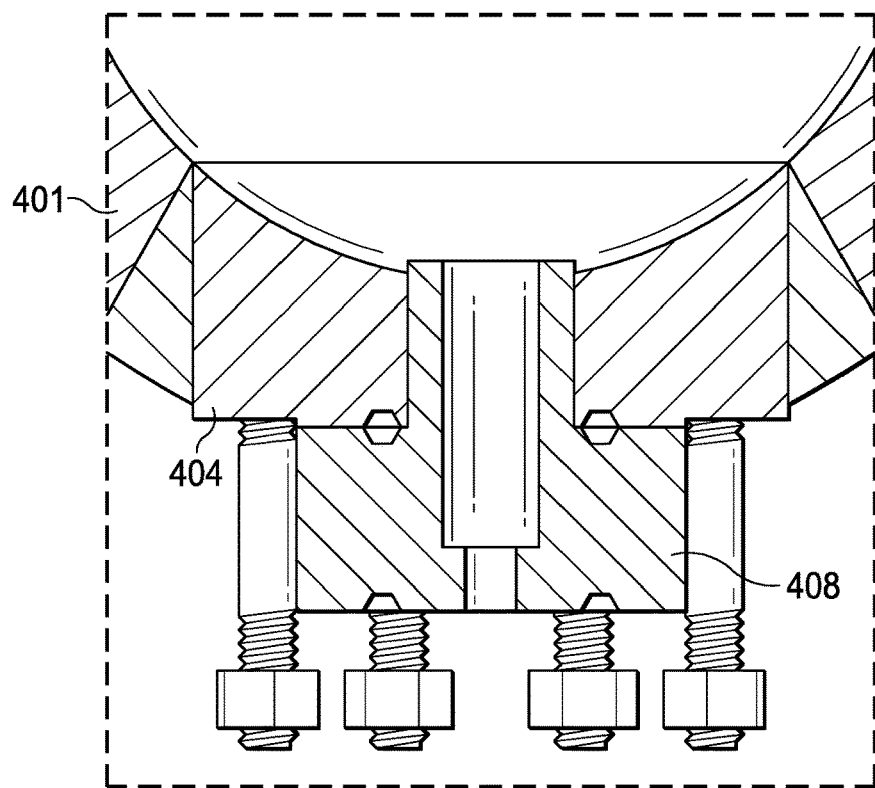
Figure 4D:
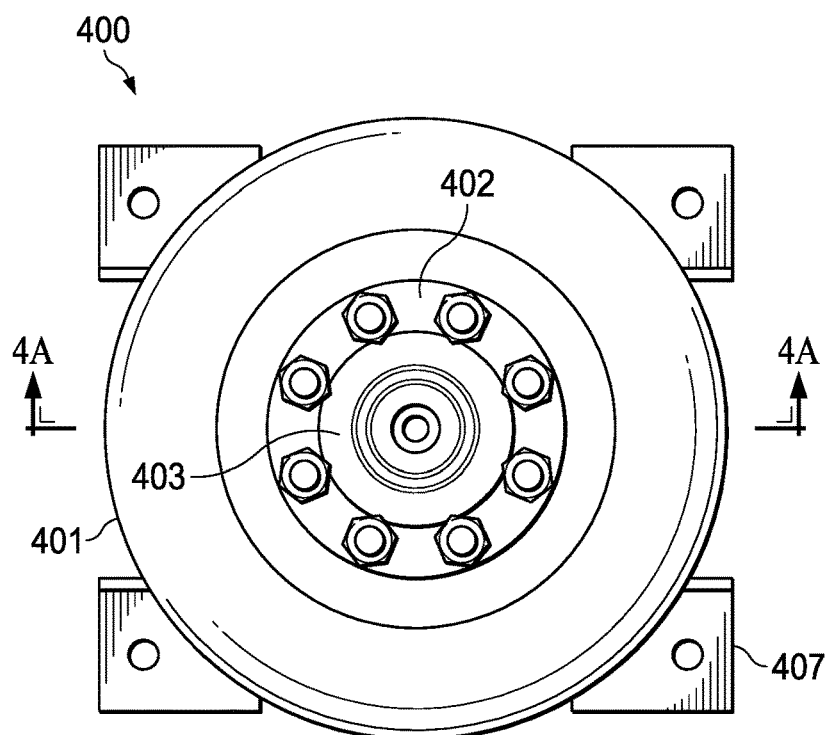

FIGS. 4A through 4D depict a pulsation dampener with wear inserts in accordance with alternative embodiments of the present disclosure. FIG. 4A is a side sectional view taken at section line A-A of the plan view in FIG. 4D. FIG. 4B is a fragmentary detail of FIG. 4A, and FIG. 4C is a fragmentary detail of FIG. 4A. FIGS. 4A through 4D are merely exemplary, for purposes of explaining the principles of the present disclosure, and are not intended to be limiting.

Pulsation dampener 400 has a flow-through design with a generally spherical body 401 having a studded inlet section 402 with a wear insert 403, a studded outlet section 404 with a combined wear insert and external pressure orifice device 408, and mounting brackets 407. For simplicity and clarity, features depicted in FIGS. 4A through 4D that correspond to similar features in FIGS. 3A through 3D are not described in detail below. Instead, only features differing from the embodiments of FIGS. 3A through 3D are discussed. Those features described in connection with FIG. 5 or 6 may be utilized in conjunction with any of the embodiments depicted in FIGS. 3A through 3E or the embodiments depicted in FIGS. 4A through 4D.

The combined wear insert and external pressure orifice device 408 operates similarly to wear insert 305 and external pressure orifice device 306 depicted in FIGS. 3A and 3C. That is, as shown in FIGS. 4A and 4C, the orifice through combined wear insert and external pressure orifice device 408 narrows along the length of that opening. The change in diameter of the orifice from the side opening to the internal volume of the body 401 to the side opening to the flanged connector (not shown) attached to the pulsation dampener 400 is selected to create the pressure differential in the pumped fluid described above. While a stepped change in diameter is depicted, a gradual or tapered change may also be employed.

Figure 5:
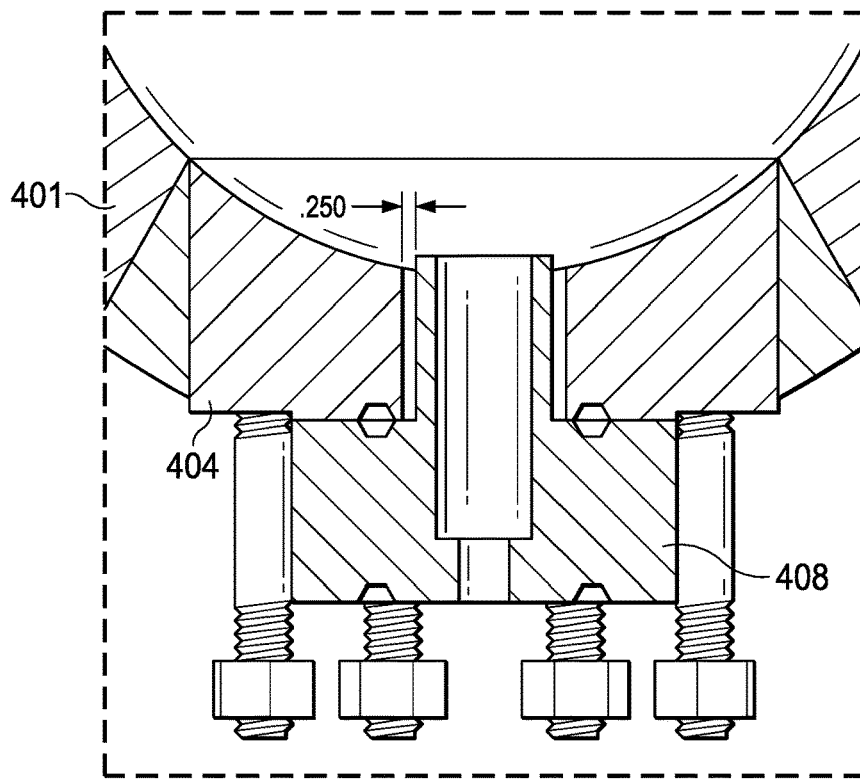
FIGS. 5 and 6 depict the detail of FIG. 4C with loose fit and tight fit, respectively.
Figure 6:
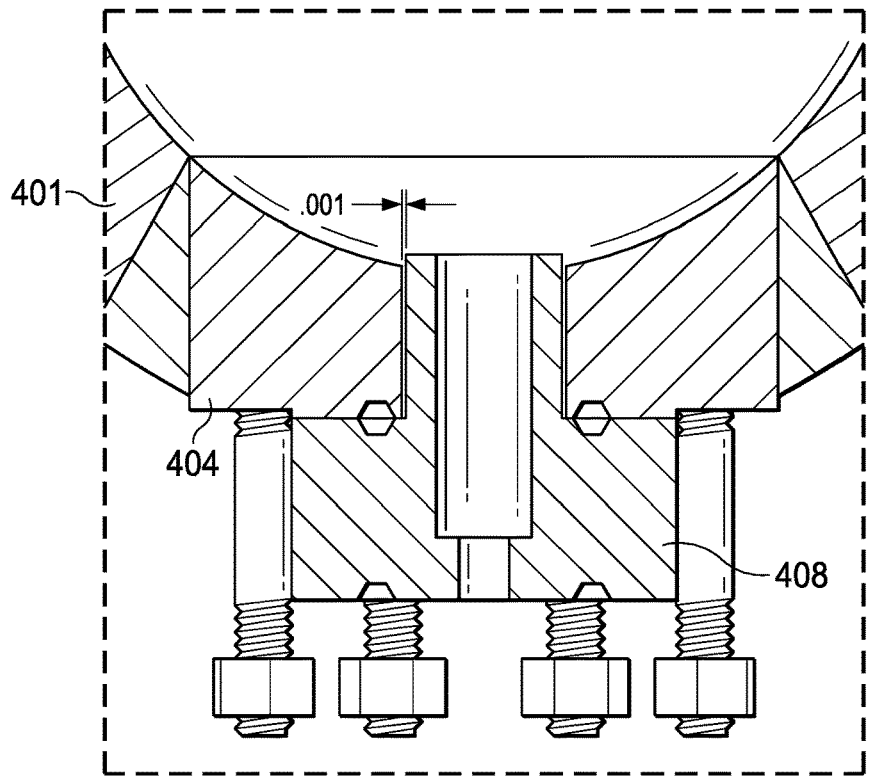

FIGS. 5 and 6 depict the detail of FIG. 4C with loose fit and tight fit, respectively. Because the combined wear insert and external pressure orifice device 408 is inserted into the opening, sand accumulation between the combined wear insert and external pressure orifice device 408 and the outlet section 404 can jam or inhibit removal of the combined wear insert and external pressure orifice device 408 from the outlet section 404. Two strategies may be employed to deal with sand accumulation between the combined wear insert and external pressure orifice device 408 and the outlet section 404: With a "loose" fit illustrated by FIG. 5, an intentional gap is left between the outer diameter of the combined wear insert and external pressure orifice device 408 and the inner diameter of the outlet section 404, so that removability of the combined wear insert and external pressure orifice device 408 from the outlet section 404 is maintained despite the presence of any sand. In FIG. 5, a gap of approximately 0.250 inches on each side (0.500 inches total) is illustrated. With a "tight" fit illustrated in FIG. 6, the outer diameter of the combined wear insert and external pressure orifice device 408 closely fits the inner diameter of the outlet section 404 in an effort to keep sand out of the gap. In FIG. 6, a gap of approximately 0.001 inches on each side (0.002 inches total) is illustrated. The "loose" fit and "tight" fit depicted in FIGS. 5 and 6 are also applicable to the wear inserts 303 and 305 described above in connection with FIGS. 3A through 3E and the wear insert 403 described above in connection with FIGS. 4A-4B and 4D. The "loose" fit and "tight" fit depicted in FIGS. 5 and 6 can have the same or different fits at the inlet sections and outlet sections. For example, an embodiment could have a tight fit at an inlet section and a loose fit at an outlet section.

Figure 7A:
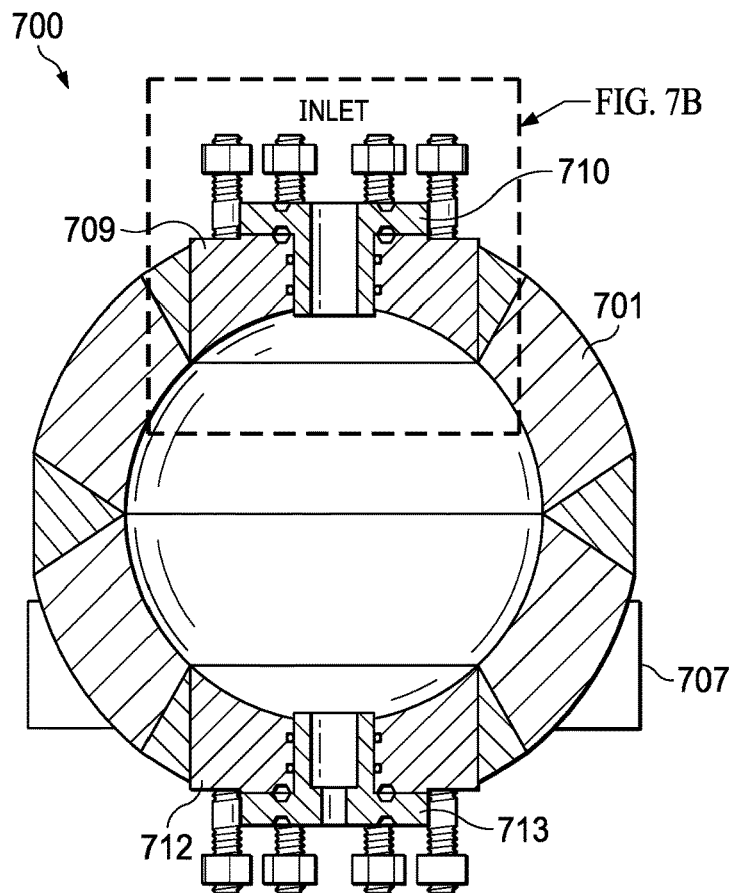
FIGS. 7A and 7B depict a pulsation dampener with grooved wear inserts in accordance with embodiments of the present disclosure.
Figure 7B:
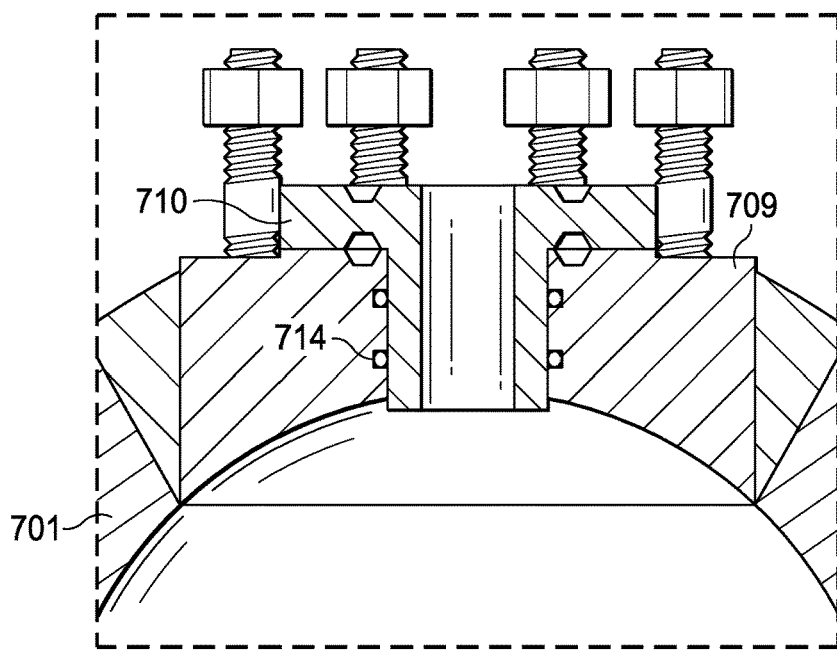

FIGS. 7A and 7B depict a pulsation dampener with grooved wear inserts in accordance with embodiments of the present disclosure. FIG. 7A is a side sectional view. FIG. 7B is a fragmentary detail of FIG. 7A. FIGS. 7A and 7B are merely exemplary, for purposes of explaining the principles of the present disclosure, and are not intended to be limiting.

Pulsation dampener 700 has a flow-through design with a generally spherical body 701 having a studded inlet section 709 with a wear insert 710, a studded outlet section 712 with a wear insert 713, and mounting brackets 707. For simplicity and clarity, features depicted in FIGS. 7A and 7B that correspond to similar features in FIGS. 3A and 3B are not described in detail below. Instead, only features differing from the embodiments of FIGS. 3A and 3B are discussed. Those features described in connection with FIGS. 7A and 7B may be utilized in conjunction with any of the embodiments depicted in FIGS. 3A through 3E, the embodiments depicted in FIGS. 4A through 4D, and/or the embodiments of FIG. 5 or 6.

Inlet section 709 and wear insert 710 generally correspond in structure and materials to the inlet section 302 and wear insert 303, and outlet section 712 and wear insert 713 generally correspond in structure and materials to the outlet section 304 and wear insert 305. However, inlet section 709 and outlet section 712 include ring grooves 714 in the sidewalls of the openings through which wear inserts 710 and 713 are to be inserted. Ring grooves 714 are sized to receive O rings for sealing any gap in between inlet section 709 and wear insert 710 and in between outlet section 712 and wear insert 713. The O rings also facilitate removability of the wear insert(s) by keeping sand from embedding in gap. Alternatively, or in addition to ring grooves 714 depicted, ring grooves (not shown) may be provided on an outer surface of wear inserts 710 and 713, and 0 rings inserted in those ring grooves.

Figure 8A:
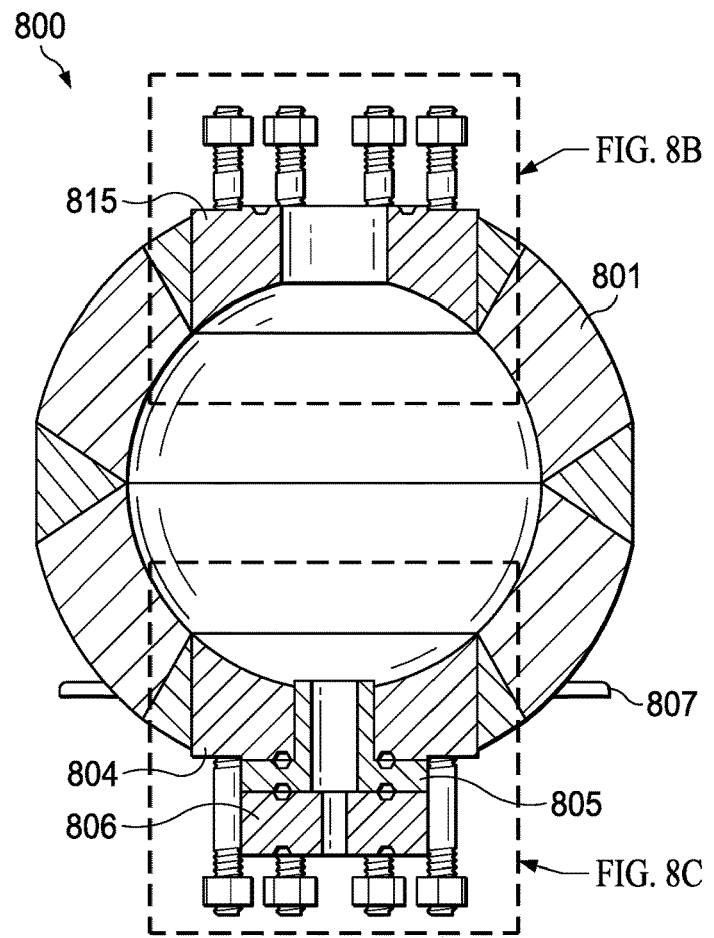
FIGS. 8A through 8C depict a pulsation dampener with alternatively sealed wear inserts in accordance with embodiments of the present disclosure.
Figure 8B:
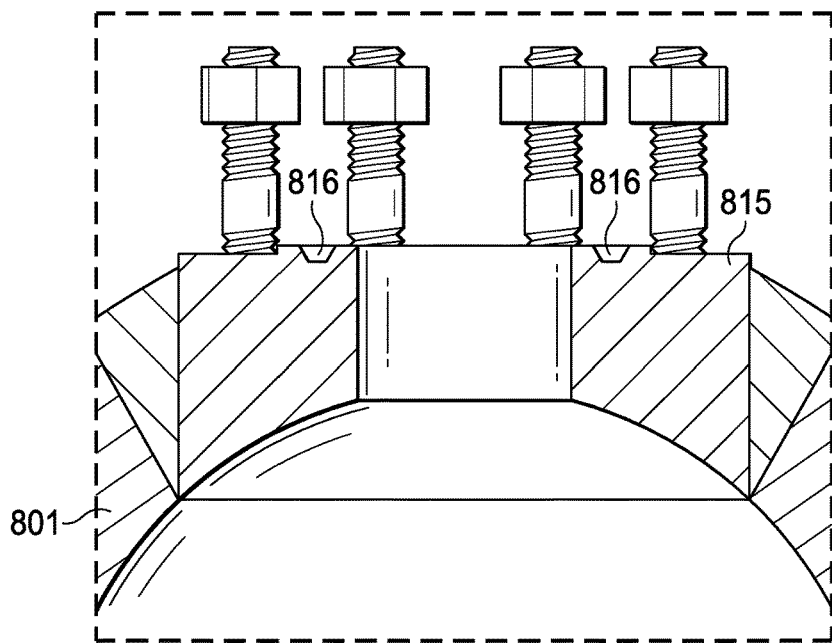
Figure 8C:
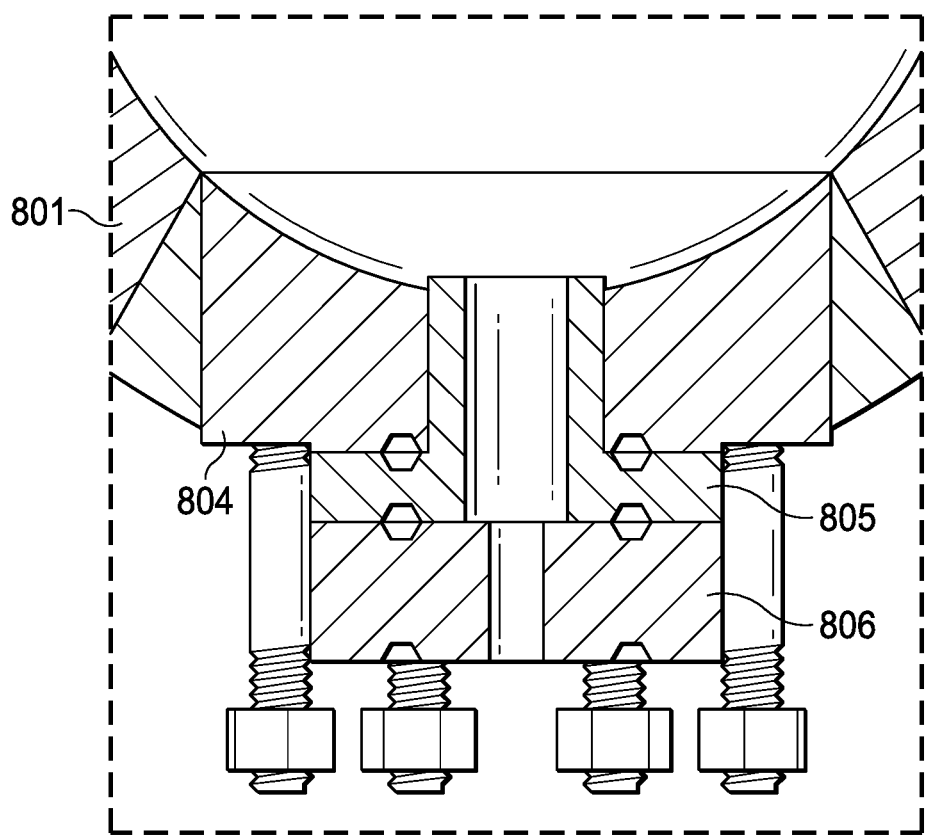

FIGS. 8A through 8C depict a pulsation dampener with alternatively sealed wear inserts in accordance with embodiments of the present disclosure. FIG. 8A is a side sectional view. FIG. 8B is a fragmentary detail of FIG. 8A; and FIG. 8C is a fragmentary detail of FIG. 8A. FIGS. 8A through 8C are merely exemplary, for purposes of explaining the principles of the present disclosure, and are not intended to be limiting.

Pulsation dampener 800 has a flow-through design with a generally spherical body 801 having a studded inlet section 815, a studded outlet section 804 with a wear insert 805 and an external pressure orifice device 806, and mounting brackets 807. For simplicity and clarity, features depicted in FIGS. 8A through 8C that correspond to similar features in FIGS. 3A through 3C are not described in detail below. Instead, only features differing from the embodiments of FIGS. 3A through 3C are discussed. Those features described in connection with FIGS. 8A through 8C may be utilized in conjunction with any of the embodiments depicted in FIGS. 3A through 3E, the embodiments depicted in FIGS. 4A through 4D, the embodiments of FIG. 5 or 6, and/or the embodiments depicted in FIGS. 7A and 7B.

Pulsation dampener 800 may be equipped with a wear insert (not shown) inserted into the inlet section 815, similar to wear insert 303 depicted in FIGS. 3A-3B and 3D-3E. Inlet section 815 includes a groove 816 on an upper surface thereof, in the area where the flange on a wear insert would contact the upper surface of inlet section 815. Groove 816 is sized to receive an O ring for sealing the interface between inlet section 815 and any wear insert. A similar groove (not shown) may be provided on an external surface of outlet section 804, in an area where a flange on wear insert 805 (or a corresponding surface of a combined wear insert and external pressure orifice device) contacts the lower surface of outlet section 804, and an O ring inserted therein. Of course, a similar groove (not shown) may also be provided on the flange of wear insert 805 (or a corresponding surface of a combined wear insert and external pressure orifice device).

Figure 9A:
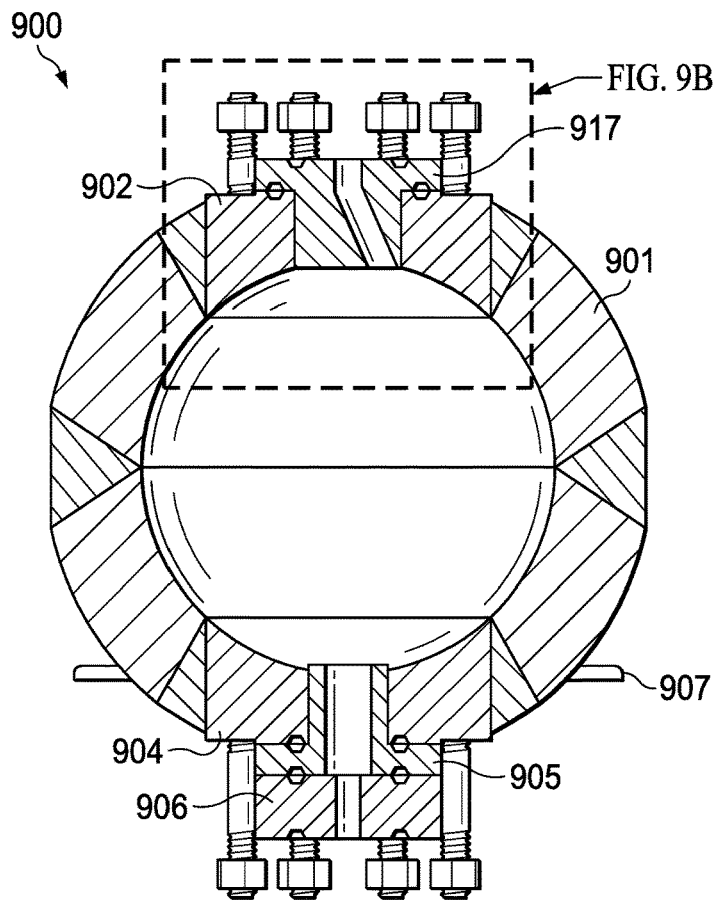
FIGS. 9A and 9B depict a pulsation dampener with wear inserts including at least one off-center flow path in accordance with embodiments of the present disclosure.
Figure 9B:
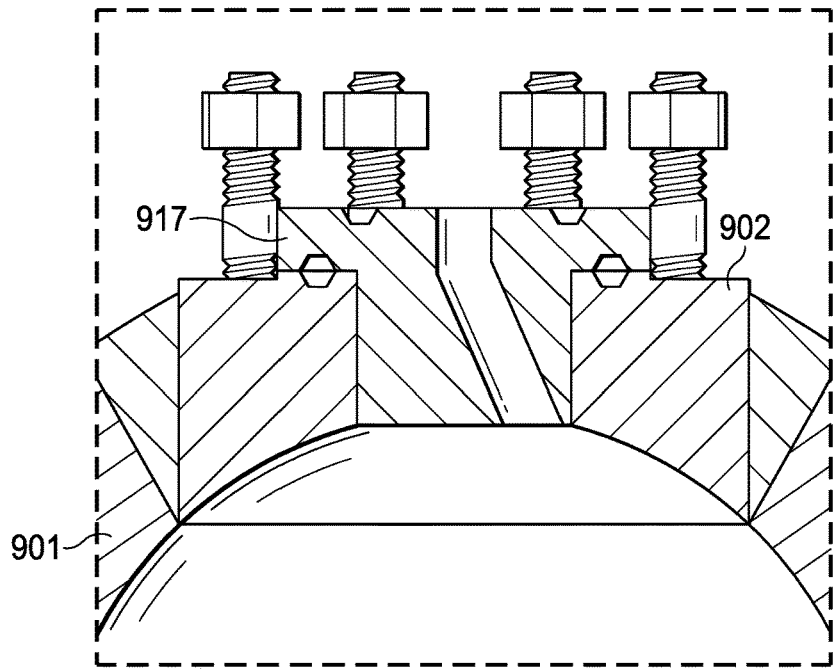

FIGS. 9A and 9B depict a pulsation dampener with wear inserts including at least one off-center flow path in accordance with embodiments of the present disclosure. FIG. 9A is a side sectional view. FIG. 9B is a fragmentary detail of FIG. 9A. FIGS. 9A and 9B are merely exemplary, for purposes of explaining the principles of the present disclosure, and are not intended to be limiting.

Pulsation dampener 900 has a flow-through design with a generally spherical body 901 having a studded inlet section 902 with a wear insert 917, a studded outlet section 904 with a wear insert 905 and an external pressure orifice device 906, and mounting brackets 907. For simplicity and clarity, features depicted in FIGS. 9A and 9B that correspond to similar features in FIGS. 3A and 3B are not described in detail below. Instead, only features differing from the embodiments of FIGS. 3A and 3B are discussed. Those features described in connection with FIGS. 9A and 9B may be utilized in conjunction with any of the embodiments depicted in FIGS. 4A through 4D, the embodiments of FIG. 5 or 6, the embodiments depicted in FIGS. 7A and 7B, and/or the embodiments depicted in FIGS. 8A and 8B.

In wear insert 917, the fluid passage is configured to prejudice the fluid flow direction, with a nozzle entry offset from perpendicular (e.g., by 25°), causing fluid flow into the internal volume of the pulsation dampener 900 to be directed off-center in order to create slight internal turbulence within that internal volume. The internal turbulence mitigates the likelihood of dead spots within which sand from the pumped fluid may accumulate (one reason that an equatorial inlet/outlet design for the pulsation dampener is avoided).

Figure 10A:
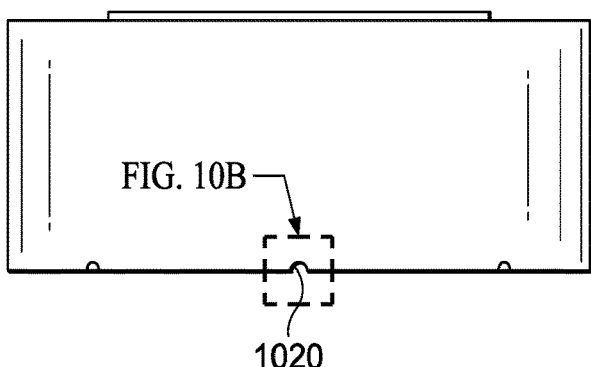
FIGS. 10A through 10E depict an outlet section with wear features for a pulsation dampener in accordance with embodiments of the present disclosure.
Figure 10B:
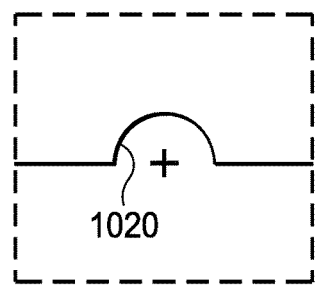
Figure 10C:
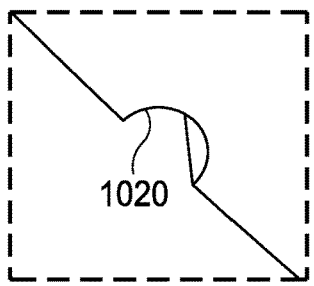
Figure 10D:
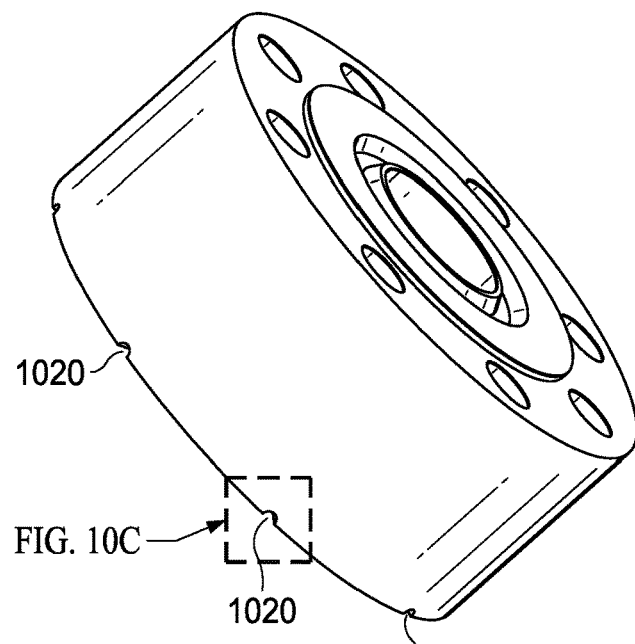
Figure 10E:
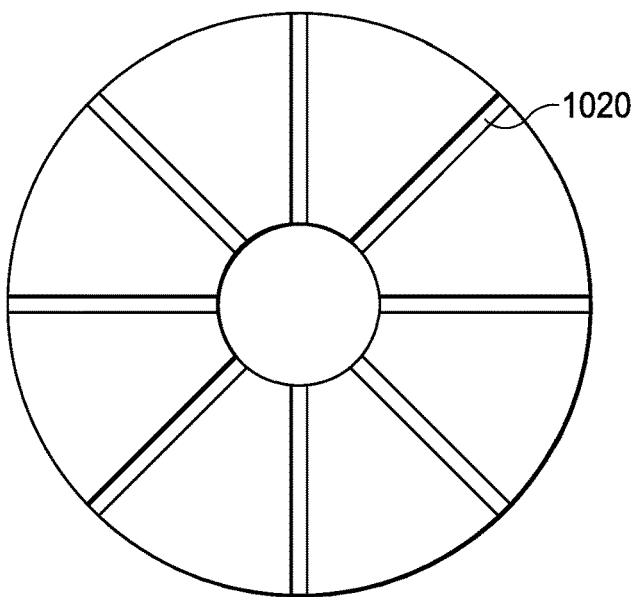

FIGS. 10A through 10E depict an outlet section with wear features for a pulsation dampener in accordance with embodiments of the present disclosure. FIG. 10A is a side elevation view, and FIG. 10B is a fragmentary detail of FIG. 10A. FIG. 10D is a perspective view, and FIG. 10C is a fragmentary detail of FIG. 10D. FIG. 10E is a bottom plan view. The outlet section may be any of outlet section 304 in FIGS. 3A and 3C, outlet section 404 in FIGS. 4A, 4C and 5-6, outlet section 712 in FIG. 7A, outlet section 804 in FIGS. 8A and 8C, and outlet section 904 in FIG. 9A.

The outlet section includes wear features 1020, eight radial semi-circular grooves in the example shown. The wear features 1020 comprise material to indicate when the component needs to be changed (for example, when the grooves lose enough depth, similar to tread on a tire). While depicted as hollow grooves in FIGS. 10A through 10E, the wear features may alternatively be filled with a solid material that wears faster than the material of the outlet section, or as an overlay on the surface of the outlet section.

Figure 11:
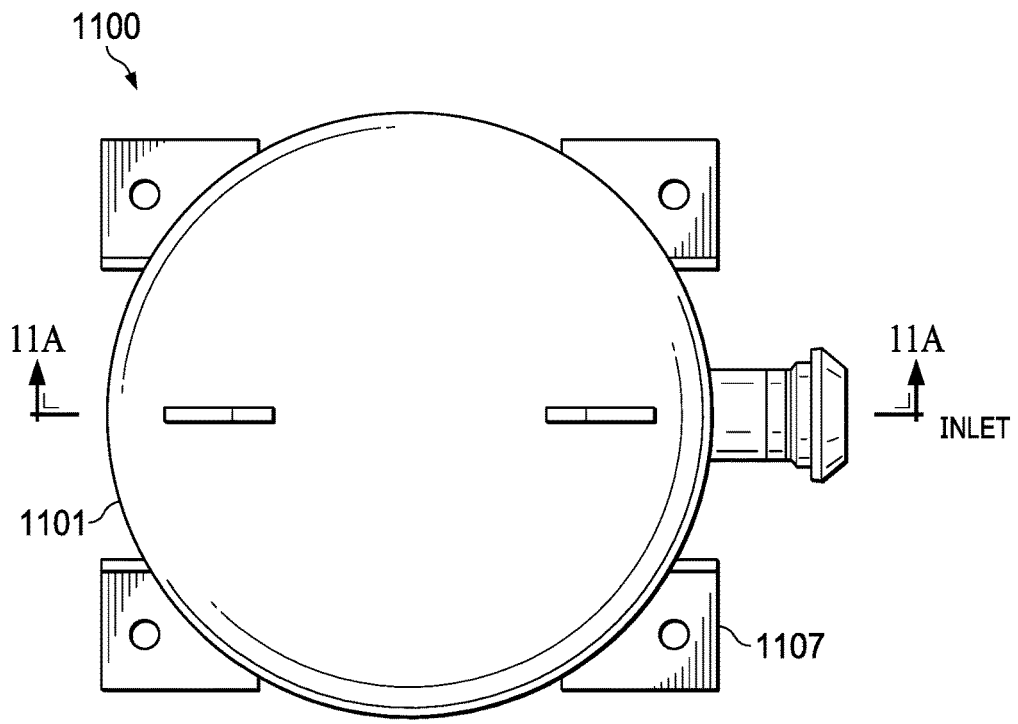
FIGS. 11 and 11A through 11C illustrate an alternative pulsation dampener configuration within which wear inserts may be implemented in accordance with embodiments of the present disclosure.
Figure 11A:
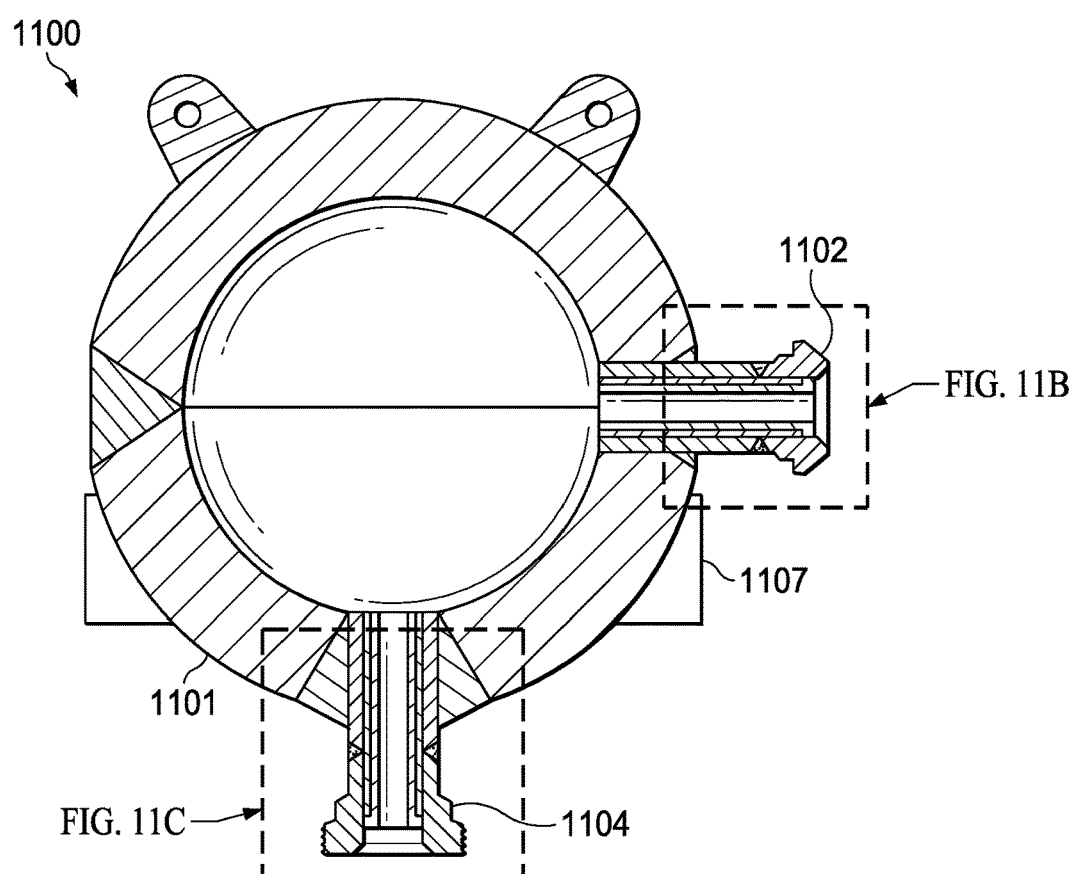
Figure 11B:
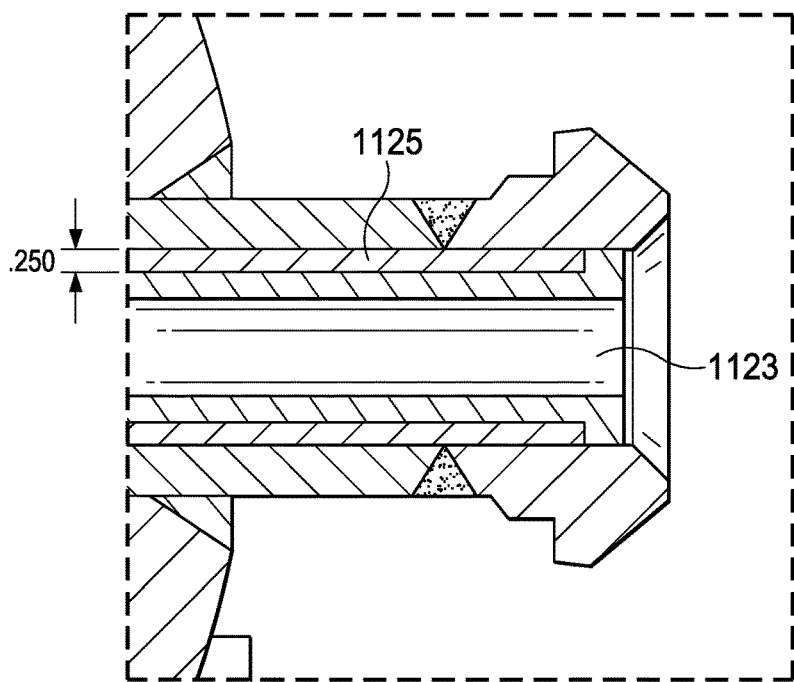
Figure 11C:
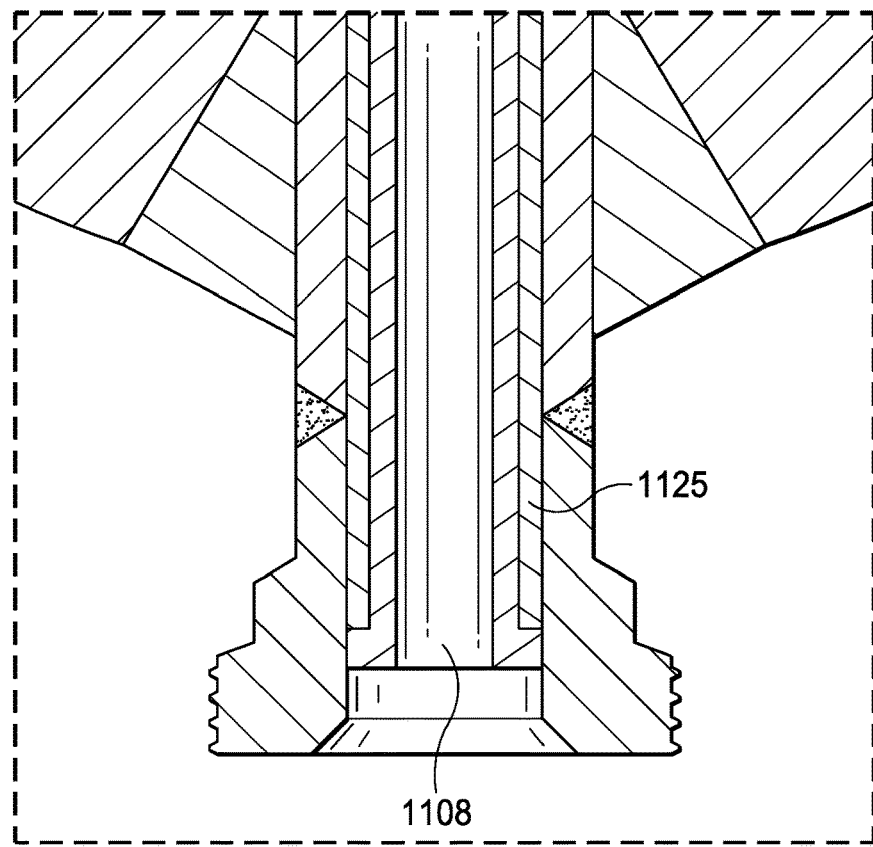

FIGS. 11 and 11A through 11C illustrate an alternative pulsation dampener configuration within which wear inserts may be implemented in accordance with embodiments of the present disclosure. FIG. 11 is a plan view and FIG. 11A is a side sectional view of FIG. 11 taken at section line A-A. FIG. 11B is a fragmentary detail of FIG. 11A, and FIG. 11C is a fragmentary detail of FIG. 11A. FIGS. 11 and 11A through 11C are merely exemplary, for purposes of explaining the principles of the present disclosure, and are not intended to be limiting.

Pulsation dampener 1100 has a flow-through design with a generally spherical body 1101 having an inlet section 1102, an outlet section 1104, and mounting brackets 1107. In this example, the inlet and outlet are oriented perpendicular to each other to create turbulent flow through the interior volume of the pulsation dampener 1100, with the outlet extending vertically below the body 1101. The inlet section 1102 and outlet section 1104 are not studded in this embodiment, relying on simply male-female connections. In the embodiment shown, each of the inlet section 1102 and the outlet section 1104 includes, inserted therein, an integrated wear insert and pressure orifice device 1123, 1108, respectively. Tubing 1125 may optionally be included around a portion of the integrated wear insert and pressure orifice devices 1123, 1108.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A pulsation dampener, comprising:
   a body;
   an inlet section extending through the body and having an opening permitting fluid flow into an interior volume of the body;
   an outlet section extending through the body and having an opening permitting fluid flow out of the interior volume of the body; and
   at least one T-shaped, removable wear insert extending from outside the body into at least one of the opening in the inlet section or the opening in the outlet section, the at least one wear insert including a flange outside the body, the at least one wear insert formed of a material resisting wear due to abrasive particulates in fluid passing through the pulsation dampener, wherein the material of the at least one wear insert is more wear resistant to the abrasive particulates than a material through which the respective one of the opening in the inlet section or the opening in the outlet section is formed, and wherein the body, a position of the opening in the inlet section, a position of the opening in the outlet section, and a size of the opening through the inlet section are configured to dampen pressure pulsations within fluid pumped into the interior volume of the body via the inlet section and out of the interior volume of the body via the outlet section.

2. The pulsation dampener according to claim 1, wherein the flange is sized to cover an area of the respective one of the opening in the inlet section or the opening in the outlet section corresponding to an inner diameter of a pipe connector to be secured to the respective one of the opening in the inlet section or the opening in the outlet section.

3. The pulsation dampener according to claim 1, wherein the material of the at least one wear insert is a tungsten-carbide alloy.

4. The pulsation dampener according to claim 1, wherein the opening in one of the inlet section or the opening in the outlet section are configured to prejudice fluid flow direction therebetween.

5. The pulsation dampener according to claim 1, wherein the opening in the inlet section and the opening in the outlet section are offset from direct alignment.

6. The pulsation dampener according to claim 1, wherein the at least one wear insert has a tight fit within the respective at least one of the opening in the inlet section or the opening in the outlet section.

7. The pulsation dampener according to claim 1, wherein the at least one wear insert has a loose fit within the respective at least one of the opening in the inlet section or the opening in the outlet section.

8. A pulsation dampener, comprising:
a body;
an inlet section extending through the body and having an opening permitting fluid flow into an interior volume of the body;
an outlet section extending through the body and having an opening permitting fluid flow out of the interior volume of the body; and
at least one wear insert removably coupled within at least one of the opening in the inlet section or the opening in the outlet section, the wear insert formed of a material resisting wear due to abrasive particulates in fluid passing through the pulsation dampener,
wherein the body, a position of the opening in the inlet section, a position of the opening in the outlet section, and a size of the opening through the inlet section are configured to dampen pressure pulsations within fluid pumped into the interior volume of the body via the inlet section and out of the interior volume of the body via the outlet section, and
wherein at least one of the opening in the inlet section or the opening in the outlet section includes one or more wear features configured to indicate when the at least one wear insert needs to be changed.

9. The pulsation dampener according to claim 8, wherein the one or more wear features is formed of a solid material that wears faster than the material of the outlet section.

10. A pump system, comprising:
a mobile-mounted pump mounted on a trailer; and
a pulsation dampener mounted on the trailer and coupled between the mobile-mounted pump and a borehole, the pulsation dampener comprising at least one T-shaped, removable wear insert extending from outside a body of the pulsation dampener into at least one opening permitting fluid flow into or out of the body, the wear insert including a portion outside the body, the wear insert formed of a material more resistant to wear due to abrasive particulates in fluid through passing the pulsation dampener than a material through which the at least one opening is formed.

11. The pump system according to claim 10, wherein the pulsation dampener is an appendage-type device.

12. The pump system according to claim 10, wherein the pulsation dampener is a flow-through device, the pulsation dampener comprising
an inlet section including a first opening permitting fluid flow into an interior volume of the body from outside the body; and
an outlet section including a second opening permitting fluid flow outside the body from the interior volume of the body,
wherein the at least one opening permitting fluid flow into or out of the body comprises one of the first opening or the second opening, and
wherein the body, a position of the first opening, a position of the second opening, and a size of the opening through the inlet section are configured to dampen pressure pulsations within fluid pumped into the interior volume of the body via the first opening and out of the interior volume of the body via the second opening.

13. The pump system according to claim 12, wherein the portion of the at least one wear insert outside the body includes a flange extending outside an area of the respective one of the first opening or the second opening and sized to correspond to an inner diameter of a pipe connector to be secured to the respective one of the first opening or the second opening.

14. The pump system according to claim 12, wherein the material of the at least one wear insert is more wear resistant than a material of the body.

15. The pump system according to claim 12, wherein the material of the at least one wear insert is a tungsten-carbide alloy.

16. The pump system according to claim 12, wherein the first opening or the second opening are configured to prejudice fluid flow direction therebetween.

17. The pump system according to claim 12, wherein the first opening and the second opening are offset from direct alignment.

18. The pump system according to claim 12, wherein at least one of the first opening or the second opening includes one or more wear features configured to indicate when the at least one wear insert needs to be changed.

\* \* \* \* \*